United States Patent
Kawauchi

(10) Patent No.: US 9,554,015 B2
(45) Date of Patent: Jan. 24, 2017

(54) IMAGE COMPRESSION APPARATUS TO PERFORM COMPRESSION OF IMAGE DATA AND DIVIDING PIXEL VALUE INTO AN INVALID AND VALID REGION TO CALCULATE VALID BIT WIDTH

(71) Applicant: FUJI XEROX CO., LTD., Tokyo (JP)

(72) Inventor: Kenichi Kawauchi, Kanagawa (JP)

(73) Assignee: FUJI XEROX CO., LTD, Tokyo (JP)

(*) Notice: Subject to any disclaimer, the term of this patent is extended or adjusted under 35 U.S.C. 154(b) by 0 days.

(21) Appl. No.: 14/854,733

(22) Filed: Sep. 15, 2015

(65) Prior Publication Data
US 2016/0277636 A1    Sep. 22, 2016

(30) Foreign Application Priority Data
Mar. 20, 2015    (JP) ................ 2015-057947

(51) Int. Cl.
*H04N 1/413*    (2006.01)
*H04N 1/00*    (2006.01)

(52) U.S. Cl.
CPC .......... *H04N 1/413* (2013.01); *H04N 1/00005* (2013.01)

(58) Field of Classification Search
CPC ...................................................... H04N 1/413
See application file for complete search history.

(56) References Cited

U.S. PATENT DOCUMENTS

| | | | | |
|---|---|---|---|---|
| 5,721,720 A | * | 2/1998 | Kikuchi | G11B 20/00007 369/275.3 |
| 6,067,380 A | * | 5/2000 | Tanaka | G06T 9/001 382/232 |
| 6,106,094 A | * | 8/2000 | Otani | B41J 29/393 347/19 |
| 2009/0123078 A1 | | 5/2009 | Ohkawa | |

FOREIGN PATENT DOCUMENTS

JP    2000287061    * 10/2000
JP    2009-124443 A    6/2009

OTHER PUBLICATIONS

Kondo Takeshi; "Image Processing Unit"; JP Pub 2000287061; JP Pub Date Oct. 13, 2000.*

* cited by examiner

*Primary Examiner* — Benny Q Tieu
*Assistant Examiner* — Haris Sabah
(74) *Attorney, Agent, or Firm* — Oliff PLC

(57) ABSTRACT

Provided is an image compression apparatus including a dividing unit that divides a bit width pixel value set in advance that indicates compressed image information into an invalid bit region and a valid bit region other than the invalid bit region that are replaced with a fixed value determined in advance, an image information conversion unit that makes a value of the valid bit region be a value of a bit corresponding to the pixel value and makes a value of the invalid bit region be the fixed value determined in advance and converts the compressed image information to conversion image information, and a compression unit that compresses the conversion image information.

10 Claims, 11 Drawing Sheets

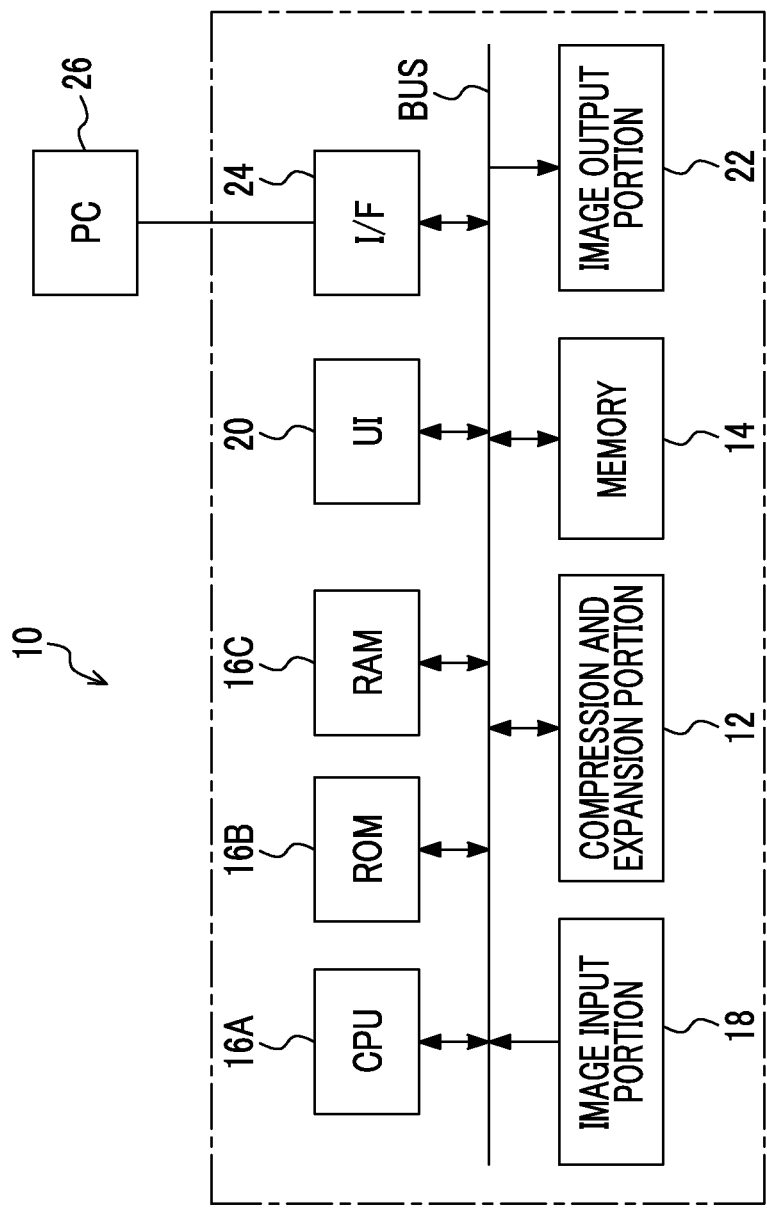

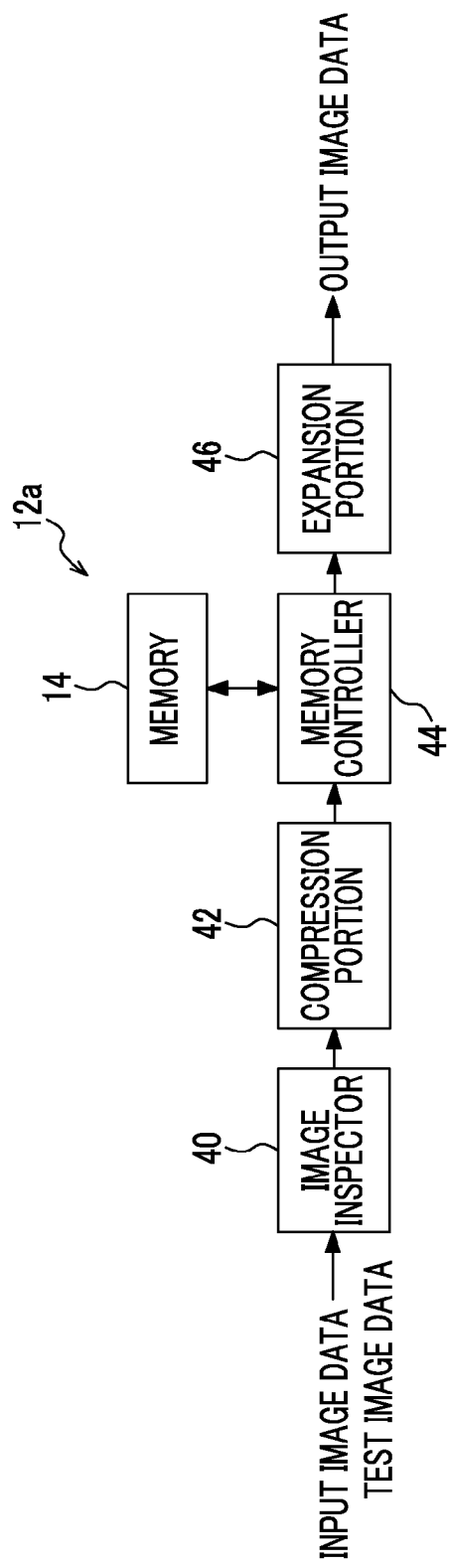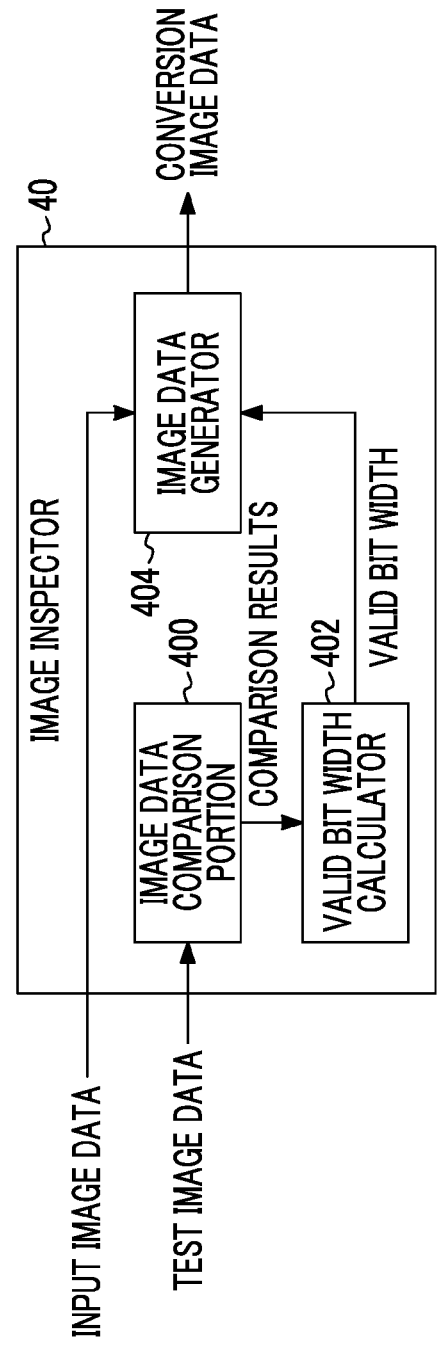

FIG. 5A

TEST IMAGE DATA

| Px1 | Px2 | Px3 | Px4 | Px5 |
|---|---|---|---|---|
| FFFF | FFF2 | FFF1 | FFFF | FFF3 |

FIG. 5B

REFERENCE IMAGE DATA

| Px1 | Px2 | Px3 | Px4 | Px5 |
|---|---|---|---|---|
| FFFF | FFFF | FFFF | FFFF | FFFF |

FIG. 5C

INPUT IMAGE DATA

| Px1 | Px2 | Px3 | Px4 | Px5 |
|---|---|---|---|---|
| FFF3 | FFFF | FFF1 | FFFE | FFF8 |

FIG. 5D

CONVERSION IMAGE DATA

| Px1 | Px2 | Px3 | Px4 | Px5 |
|---|---|---|---|---|
| FFFF | FFFF | FFFF | FFFF | FFFF |

FIG. 5E

| ID | PIXEL VALUE | RUN LENGTH |
|---|---|---|

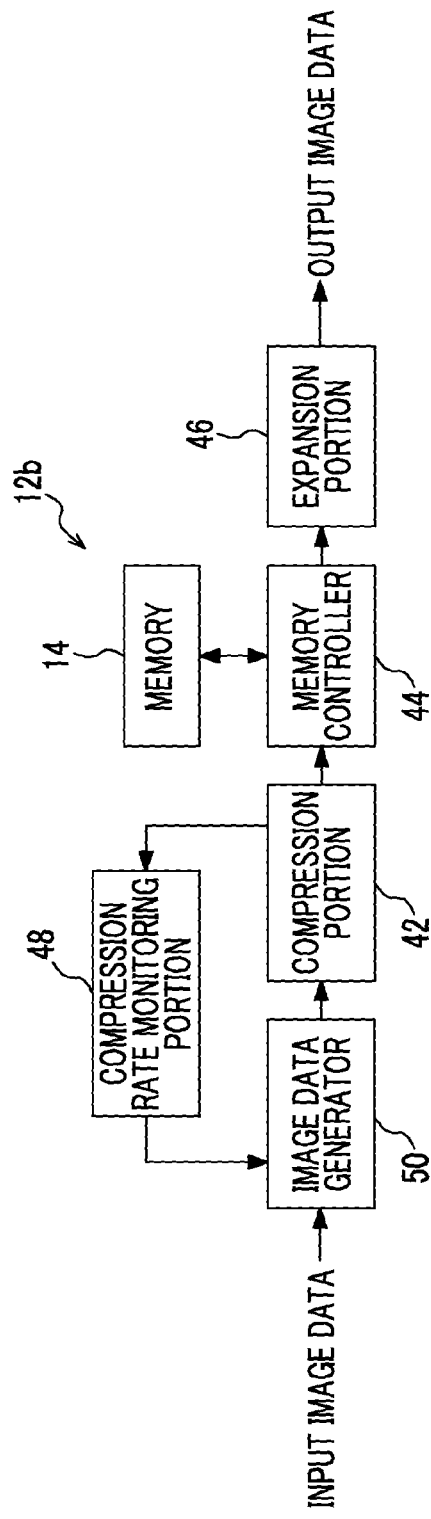
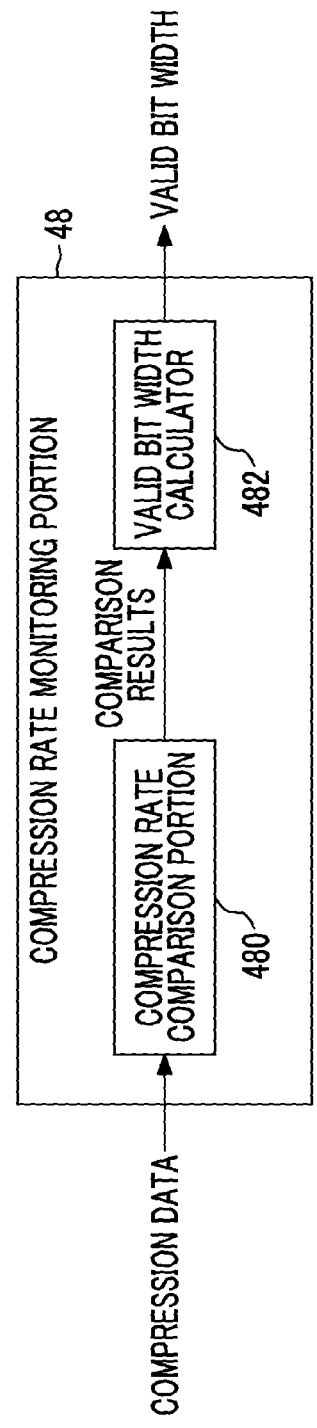

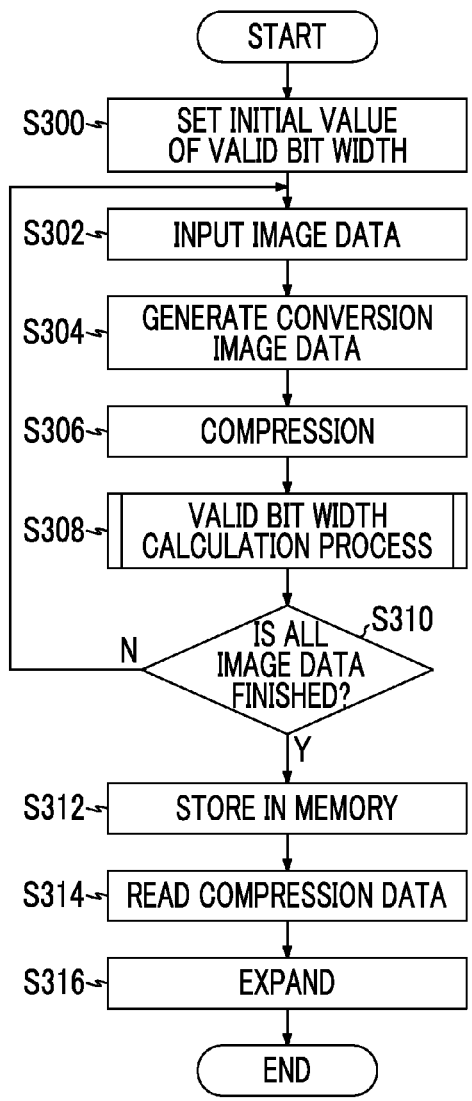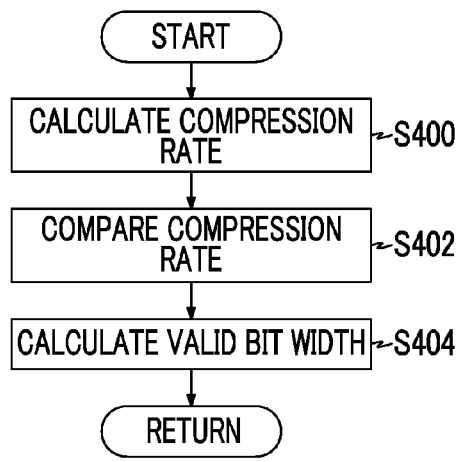
FIG. 9A
FIG. 9B

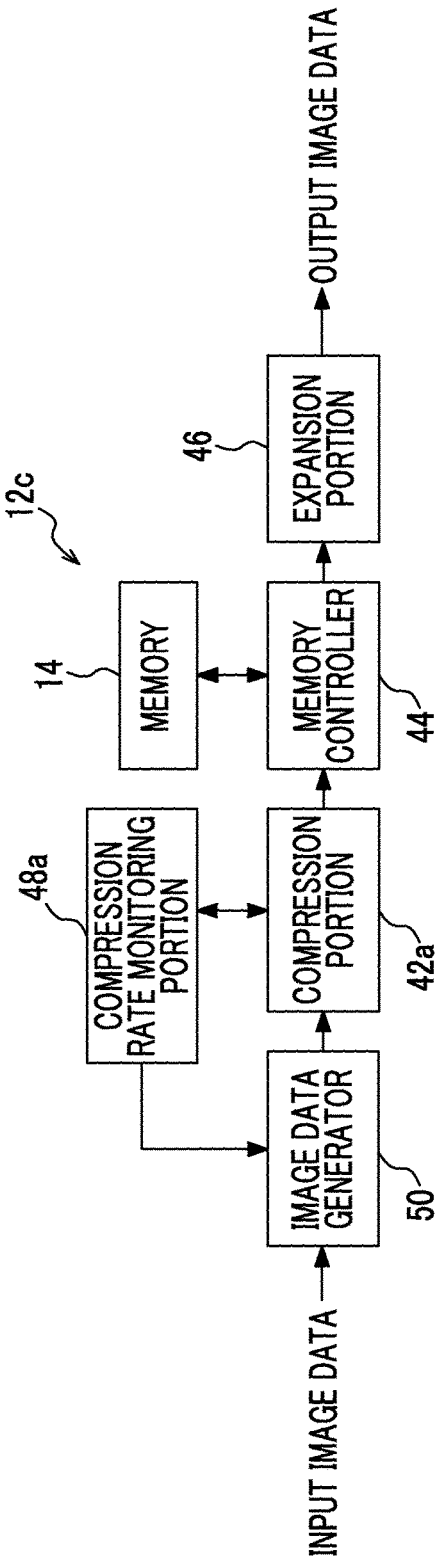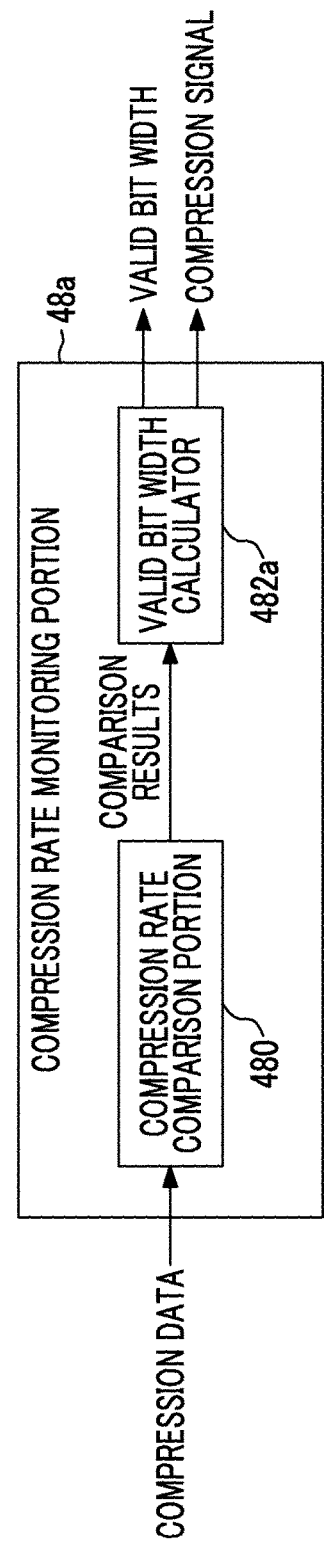

IMAGE COMPRESSION APPARATUS TO PERFORM COMPRESSION OF IMAGE DATA AND DIVIDING PIXEL VALUE INTO AN INVALID AND VALID REGION TO CALCULATE VALID BIT WIDTH

CROSS-REFERENCE TO RELATED APPLICATIONS

This application is based on and claims priority under 35 USC 119 from Japanese Patent Application No. 2015-057947 filed Mar. 20, 2015.

BACKGROUND

Technical Field

The present invention relates to an image compression apparatus and an image processing apparatus.

SUMMARY

According to an aspect of the invention, there is provided an image compression apparatus including:

a dividing unit that divides a bit width pixel value set in advance that indicates compressed image information into an invalid bit region and a valid bit region other than the invalid bit region that are replaced with a fixed value determined in advance;

an image information conversion unit that makes a value of the valid bit region be a value of a bit corresponding to the pixel value and makes a value of the invalid bit region be the fixed value determined in advance and converts the compressed image information to conversion image information; and a compression unit that compresses the conversion image information.

BRIEF DESCRIPTION OF THE DRAWINGS

Exemplary embodiments of the present invention will be described in detail based on the following figures, wherein:

FIG. 1 is a block diagram showing an example of a main configuration of an electrical system of an image processing apparatus according to the exemplary embodiment;

FIGS. 2A and 2B are block diagrams showing an example of the configuration of a compression and expansion portion according to a first exemplary embodiment;

FIGS. 5A to 5E are diagrams showing an example of each image data item and data format of a run length compressed pixel value according to the first exemplary embodiment;

FIGS. 8A and 8B are block diagrams showing an example of the configuration of a compression and expansion portion according to a second exemplary embodiment;

FIGS. 9A and 9B is a flowchart showing a processing flow of a compression and expansion processing program and a flowchart showing a processing flow of a valid bit width calculation processing subroutine program according to the second exemplary embodiment;

FIGS. 11A and 11B are block diagrams showing an example of the configuration of a compression and expansion portion according to a third exemplary embodiment.

DETAILED DESCRIPTION

Figure 3:
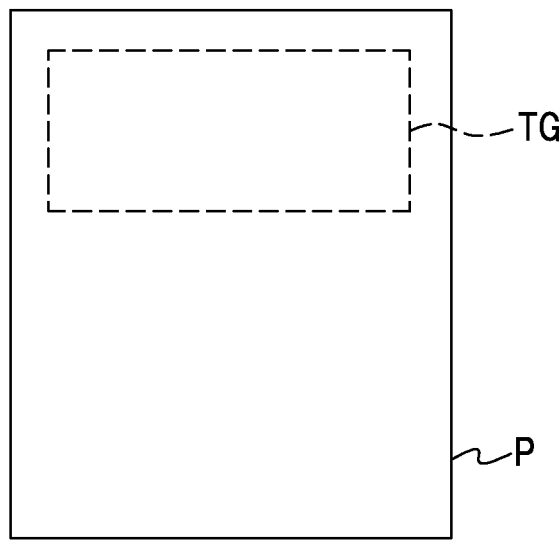
FIG. 3 is a diagram showing an example of a test image according to the first exemplary embodiment.

Below, exemplary embodiments of the invention are described in detail with reference to the drawings. Below, the image compression apparatus according to an exemplary embodiment of the invention will be described with an aspect in which the apparatus is applied to compression of image data in an image processing apparatus given as an example. The image processing apparatus may be an image input apparatus such as a scanner including an image processing function or an image forming apparatus such as a printing output apparatus.

FIG. 1 is a block diagram showing an example of a main configuration of an electrical system of an image processing apparatus 10 according to the exemplary embodiment. As shown in FIG. 1, the image processing apparatus 10 is provided with a compression and expansion portion 12, a memory 14, a central processing unit (CPU) 16A, a read only memory (ROM) 16B, a random access memory (RAM) 16C, an image input portion 18, a user interface (UI) 20, an image output portion 22, and an interface (I/F) 24.

The CPU 16A coordinates and controls the entire image processing apparatus 10. The ROM 16B is a storage unit in which a control program that controls the operation of the image processing apparatus 10, a compression and expansion program, described later, or various parameters and the like are stored in advance. The RAM 16C is a storage unit used as a work area or the like during execution of various programs.

The UI 20 is configured from a touch panel display or the like in which a transparent touch panel is overlaid on a display, on which a variety of information is displayed on a display surface of the display, and to which a user inputs desired information and instructions by touching the touch panel.

The I/F 24, as an example, is connected to a terminal apparatus (in FIG. 1, denoted as PC 26) such as a personal computer, and is an interface for receiving a variety of data such as image data from the terminal apparatus, or conversely, transmitting a variety of data such as image data generated in the image processing apparatus 10 to the terminal apparatus or the like.

The CPU 16A, the ROM 16B, the RAM 16C, the UI 20, and the I/F 24 are connected to one another via a system bus BUS.

The image input portion 18 is configured by, for example, a scanner, and is a component that optically performs reading of an original document, and generates image data of the read document. The image output portion 22 is a component that performs image formation (printing) based on image data on a recording medium, such as a recording paper according to, for example, an electro-photographic method.

The memory 14 is a storage unit that stores image data acquired by the image input portion 18 or image data supplied from the PC 26, or the like.

The compression and expansion portion 12 is a component that subjects image data to compression processing when the image data is stored in the memory 14, and subjects the compressed image data to expansion processing when the image data is read out from the memory 14.

The image input portion 18, the image output portion 22, the compression and expansion portion 12, and the memory 14 are also connected to the system bus BUS. Accordingly, the CPU 16A also performs control of the operation of the image input portion 18, the image output portion 22, the compression and expansion portion 12, and the memory 14.

Incidentally, in a case where the input unit of the image input portion 18 is a scanner or the like, a sensor such as a charge coupled device (CCD) line sensor configured by a CCD or a complementary metal-oxide semiconductor (CMOS) image sensor is frequently used as an original document image reading unit. The image data detected with the sensor is converted to data with a predetermined number of bits, (for example, 16 bit), thereby generating image data.

The pixel value of the image data read (detected) by the sensor is a factor in the noise, sensor reading precision or the like, and there are cases where the bit that configures the image data, in particular, the lower order bit fluctuates. For example, there are cases where the pixel value of the image data in which the white portion is detected by the sensor fluctuates from xFFFF to xFFF0 with respect to the target value xFFFF.

Meanwhile, when the image data generated by the image input portion 18 is stored in the memory 14, there are cases where the image data is subjected to compression processing by the compression unit in order to increase the storage efficiency. In a case where the image data subjected to compression processing and stored in the memory 14 is read out, the data is subjected to expansion processing that is the reverse process to the compression processing, and the image data corresponding to the original image data is reproduced.

Although various methods have been researched as the compression method, there is a run length compression as one method among these. The run length compression is a compression method that reduces the data amount by substituting continuously appearing data at a repeated count. In cases where the compression is performed with respect to the image data detected by the sensor with a run length method, when the value of the bit fluctuates as above, since the pixel value having a fluctuating part is difficult to compress, the compression rate is lowered. Accordingly, not only that it is difficult to expect high compression rates through the compression process, but also, depending on the case, the post-compression data amount increasing to be greater than the pre-compression image data amount is considered.

In the invention, it is devised that the same pixel values are continuous in a range that adversely affects the original image data as little as possible. That is, the bit region in which it is estimated that the pixel value does not fluctuate is the valid bit region, and the remaining region (bit region that fluctuates) is the invalid bit region, the bit value of the original image data is allocated to the valid bit region, a fixed value set in advance is allocated to the invalid bit region (substituted with a fixed value), and the part that is the fixed pixel value increases in the image data. In so doing, the compression rate is improved.

(First Exemplary Embodiment)

The compression and expansion portion according to the exemplary embodiment will be described with reference to FIGS. 2A to 7. FIG. 2A shows a block diagram of a compression and expansion portion 12a according to the exemplary embodiment, and FIG. 2B shows a block diagram of an image inspector 40 that configures a portion of the compression and expansion portion 12a. The exemplary embodiment is an aspect that uses a test image before execution of the compression process, determines the valid bit region (or invalid bit region), and performs the compression process using the valid bit region determined.

As shown in FIG. 2A, the compression and expansion portion 12a according to the exemplary embodiment is provided with the image inspector 40, a compression portion 42, a memory controller 44, and an expansion portion 46. The memory 14 in which the image data (compression data) subjected to compression processing is stored is also displayed together in FIGS. 2A and 2B. In FIG. 2A, although shown as a process in which the compression process and expansion process according to the exemplary embodiment are continuous, these processes are able to be executed independently.

The image inspector 40 inspects the image data of the test image (text image data) input before execution of the compression process and expansion process, considers the noise, reading precision of the sensor and the like, and calculates the valid bit width of the pixel value. The calculated valid bit width is used, and a data conversion process is performed with respect to the image data which is input (input image data).

The test image data according to the exemplary embodiment is acquired by reading, with the sensor, the test image in which a reference image is printed on recording paper as a recording medium. FIG. 3 shows a test image TG in which a reference image is printed on a recording paper P. In the exemplary embodiment, the reference image is the region with a predetermined size having a specified pixel value (reference pixel value), and the test image TG is formed with a solid pattern with a reference pixel value, as an example. Although the reference pixel value is not particularly limited, in the exemplary embodiment the value is xFFFF that is the color white. The test image data may be read in advance with the sensor and stored in a storage unit such as the ROM 16B or a non-volatile memory (NVM), not shown.

Figure 4:
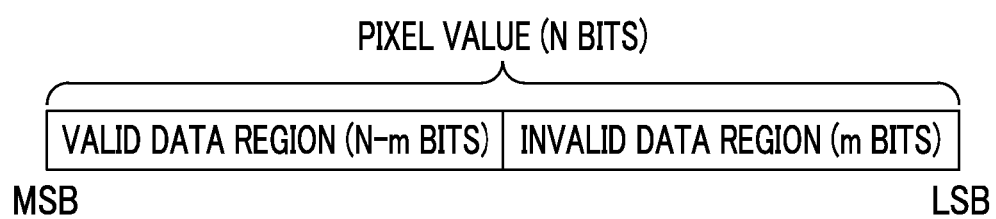
FIG. 4 is a diagram describing a valid bit region and an invalid bit region according to the first exemplary embodiment.

The valid bit width, valid data region, and invalid data region according to the exemplary embodiment will be described with reference to FIG. 4. FIG. 4 shows the bit arrangement from least significant bit (LSB; lowest order bit) to most significant bit (MSB: highest order bit) of the image data in a case where the pixel value is N bits. In the exemplary embodiment, in a case where the fluctuations in the value are measured from the LSB to the mth bit, the m bit is defined as the "invalid data region". The (N–m) bit in which the m is reduced from the total number of bits N is referred to as the "valid data region". In the exemplary embodiment, the "bit width" signifies the number of digits of the bit array of the pixel value. Accordingly, the bit width of the pixel value is N bits, the bit width of the valid data region is (N–m) bits, and the bit width of the invalid data region is m bits. The bit width N bits of the pixel value may be 16 bits, as an example.

The data conversion process according to the exemplary embodiment makes the value of the bit associated with the valid bit region the pixel value of the input image data, and makes the value of the bit associated with the invalid bit region the fixed value set in advance. Although the fixed value is not particularly limited as long as the fixed value is the same within the input image data, the value is make white, black, or the pixel value average, in the exemplary embodiment. White is valid when the input image data is close to white, and black is valid when the input image data is close to black. The input image data according to the exemplary embodiment is image data acquired by the sensor, not shown, of the image input portion 18 as described above. The image data acquired by the sensor is supplied to from the PC 26 as input image data.

Returning to FIG. 2A, the compression portion 42 executes the compression process with respect to image data (conversion image data) subjected to a data conversion process by the image inspector 40. In the exemplary embodiment, the run length compression is used as the compression method.

The calculation of the valid bit region, data conversion process, and the compression process will be described in more detail with reference to FIGS. 5A to 5E.

The calculation of the valid bit width according to the exemplary embodiment will be described with reference to FIGS. 5A and 5B. FIG. 5A shows an example of test image data according to the exemplary embodiment, and FIG. 5B shows an example of reference image data. As shown in FIG. 5A, in the exemplary embodiment, one pixel value is indicated by 16 bits. FIG. 5A shows the pixel value in which the 5 pixels PX1 to Px5 are represented as a hexadecimal number.

FIG. 5B is reference image data corresponding to the test image data in FIG. 5A represented with the same display format as FIG. 5A. In the exemplary embodiment, the reference image is a white solid pattern, and the reference pixel value is xFFFF.

When the test image data shown in FIG. 5A and the reference image data shown in FIG. 5B are compared, lower 4 bits of the test image data fluctuates in order of F, 2, 1, F, and 3 from Px1. In contrast, the upper 12 bits of the test image data do not fluctuate with respect to the reference image data. Accordingly, in the example, the invalid bit width m is m=4, and the valid bit width (N−m) is (N−m)=12 (=16−4).

Next, the data conversion process will be described with reference to FIGS. 5C and 5D.

FIG. 5C shows an example of input image data, and FIG. 5D shows an example of conversion image data in which the input image data is subjected to a data conversion process shown in FIG. 5C.

The input image data shown in FIG. 5C shows a case where the region of a pixel value close to white in the input image data is input, as an example. The lower 4 bits of the input image data vary in order of 3, F, 1, E, and 8 from Px1. The lower 4 bits are the invalid data region from the results of the inspection, and are a region with a low reliability as data. Accordingly, in the data conversion process according to the exemplary embodiment, as shown in FIG. 5D, the upper 12 bits that are the valid bit region are made the value of bits corresponding to the pixel value of the input image data, and the pixel value of the lower 4 bits that are the invalid bit region are substituted with the fixed value F.

FIG. 5E shows the data format of image data subjected to run length compression. As shown in FIG. 5E, the compression data includes each of the regions "ID", "pixel value" and "run length". ID is an identifier that identifies whether the data is compressed data, for example, with respect to the data subjected to run length compression, ID=0, and with respect to other data, ID=1. The pixel value is the post-data conversion pixel value, and, in the example as shown in FIG. 5D, is xFFFF. The run length is the number of continuous pixel values xFFFF, and, in the example as shown in FIG. 5D, if the pixel value from Px1 and back and the pixel value of Px5 forward is a pixel value other than xFFFF, the run length is 5. Accordingly, when the conversion image data as shown in FIG. 5D is compressed, the post-compression image data is x0FFFF5.

Returning to FIG. 2A, the memory controller 44 stores compression data compressed by the compression portion 42 in the memory 14. The compression data stored in the memory 14 is read out.

The expansion portion 46 expands the compression data read out by the memory controller 44, generates image data corresponding to the input image data, and outputs the result as output image data.

In the exemplary embodiment, each configuration of the image inspector 40, the compression portion 42, the memory controller 44, and the expansion portion 46 are controlled by the CPU 16A.

Next, the image inspector 40 according to the exemplary embodiment will be described with reference to FIG. 2B. As shown in FIG. 2B, the image inspector 40 is provided with an image data comparison portion 400, a valid bit width calculator 402, and an image data generator 404.

The image data comparison portion 400 compares the pixel value of the input test image data and the reference pixel value, and sends the compared results to the valid bit width calculator 402. The compared results are, for example, number of bits m of the lower order bits different to the reference pixel value of N bits from the pixel value of the N bits of the test image data. The image data comparison portion 400 sequentially transfers the comparison results for each pixel of the test image data to the valid bit width calculator 402, and when the image is read by the sensor provided in the image input portion 18 according to the comparison results, it may be understood if fluctuations arise with respect to the reference pixel value in any bit region of the pixel value of the read image data, that is, the reading precision of the sensor. The reference pixel value that is the target of the comparison may be stored in the storage unit, such as the ROM 16B.

The valid bit width calculator 402 obtains the statistics of the lower order m bits for which the pixel value is different while receiving the comparison results for each pixel from the image data comparison portion 400. When the entire input of the test image data is finished, the valid bit width (N−m) of the valid bit region shown in FIG. 4 is calculated according to the statistical results. The details of the statistics used here will be described later.

In the exemplary embodiment, the image data comparison portion 400 sequentially sends the comparison results of the pixel value of the test image data and the reference pixel value to the valid bit width calculator 402, and although an aspect is described in which the valid bit width calculator 402 calculates the statistics one-by-one as an example, there is no limitation thereto. For example, the image data comparison portion 400 sends all of the comparison results for the image data to the valid bit width calculator 402 after acquisition, and the valid bit width calculator 402 may collectively calculate the statistics based on all of the comparison results.

The image data generator 404 uses the valid bit width received from the valid bit width calculator 402, subjects the input image data that is input to the previously described data conversion process, and outputs the conversion image data.

Figure 6A:
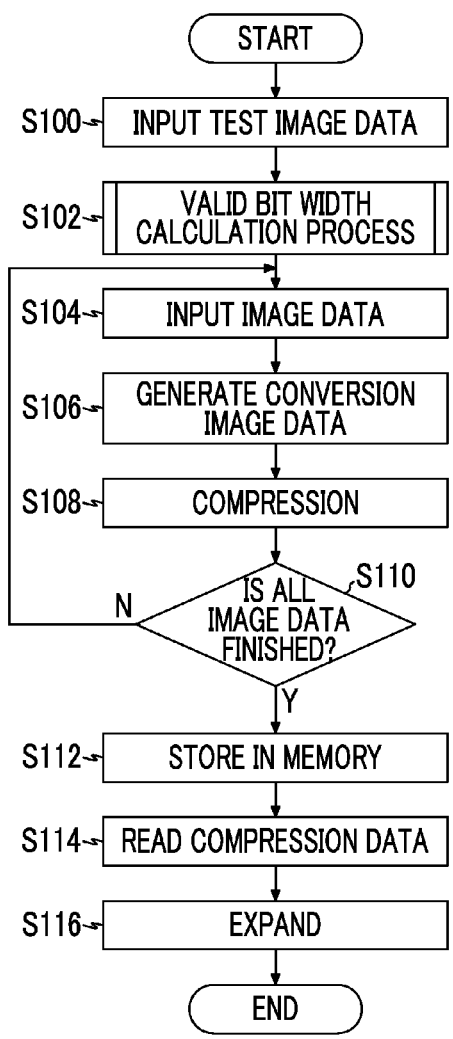
FIGS. 6A and 6B are flowcharts showing a processing flow of a compression and expansion processing program and a flowchart showing a processing flow of a valid bit width calculation processing subroutine program according to the first exemplary embodiment.
Figure 6B:
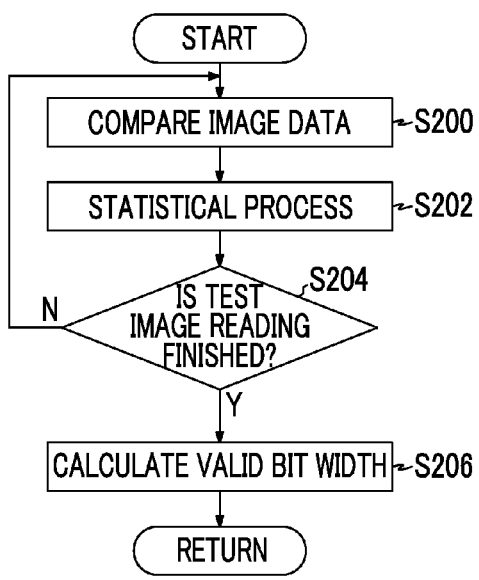

Next, the compression and expansion processing according to the exemplary embodiment will be described with reference to FIGS. 6A to 6B. FIG. 6A is a flowchart showing the processing flow of the compression and expansion processing program according to the exemplary embodiment, and FIG. 6B is a flowchart showing the processing flow of the valid bit width calculation processing subroutine called by the compression and expansion processing program. In FIGS. 6A and 6B, although the inspection using the test image, compression process, and expansion process are described as a continuous series of processes, naturally, these processes may be executed independently as separate processes. For example, the inspection using the test image may be performed once when the power source of the image processing apparatus 10 according to the exemplary embodiment is turned on, or may be performed at regular intervals.

When the process shown in FIGS. 6A and 6B forms an execution start command, the CPU 16A reads and executes the present compression and expansion processing program from the storage unit such as the ROM 16B.

In the exemplary embodiment, an aspect is described as an example in which the present compression and expansion processing program is stored in advance in the ROM 16B or the like. However, there is no limitation thereto, and an aspect in which the present compression and expansion processing program is provided in a state of being stored on a transportable storage medium readable by a computer or an aspect in which the program is delivered via a communication unit in a wired or wireless manner may be applied.

In the exemplary embodiment, although the present compression and expansion process is realized by a software configuration using a computer by executing a program, there is no limitation thereto. For example, the function may be realized by a hardware configuration using an application specific integrated circuit (ASIC) or a combination of a hardware configuration and a software configuration.

In the flowcharts shown in FIGS. 6A and 6B, a recording paper P on which a test image TG shown in FIG. 3 is printed is read by the sensor, and read test image data is already stored in the storage unit such as the RAM 16C. Alternatively, the test image data read by the sensor is stored in advance in the ROM 16B and the like. Commands for the start of inspection according to the test image, compression process, and expansion process are already carried out by the image processing apparatus 10 via the UI 20 or the like.

In the Step S3100, the image inspector 40 (image data comparison portion 400) is controlled so as to input the test image data.

In the next step S102, the valid bit width calculation processing subroutine shown in FIG. 6B is called so as to execute the valid bit width process. The valid bit width process will be described with reference to FIG. 6B.

In step S200, the image data comparison portion 400 is controlled so that the pixel value of the test image data and the reference pixel value are compared for each pixel value.

In the next step S202, the valid bit width calculator 402 is controlled so that a statistical process is executed for the comparison results acquired in the step S200.

Figure 7:
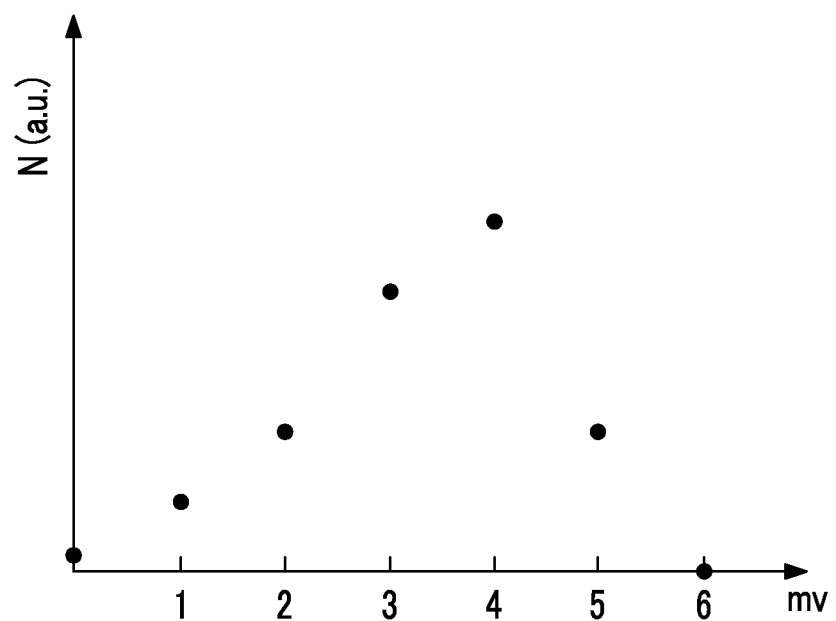
FIG. 7 is a diagram showing an example of a histogram according to the first exemplary embodiment.

FIG. 7 shows an example of the statistical process according to the exemplary embodiment. In the exemplary embodiment, the bit width mv (1–N) that fluctuates on the horizontal axis is obtained, the number (number of times) N in which the fluctuation bit width mv is generated on the vertical axis is obtained, the number of times N is calculated for each fluctuation bit width mv, and a histogram as shown in FIG. 7 is created. Therefore, in the exemplary embodiment, a counter is included corresponding to each fluctuation bit width mv, and the counter of the corresponding fluctuation bit width mv is counted up each time the comparison results are received.

In the next step S204, it is determined whether the reading of the test image data by the image data comparison portion 400 is finished. In a case where the determination is a negative determination, the process returns to the step S200, and the comparison of the image data continues. Meanwhile, in a case where the determination is a positive determination, the process proceeds to the step S206. In this case, the creation of the histogram shown in FIG. 7 is completed.

In the next step S206, calculation of the valid bit width is performed. In the calculation of the valid bit width, firstly, the bit width m of the invalid bit region that is a region with values different to one another in the pixel value of N bits is determined. The valid bit width (N−m) is calculated from the bit width m. After calculation of the valid bit width (N−m), the process returns to the main routine.

The calculation method of the valid bit width (N−m) according to the exemplary embodiment will be described in further detail. In the exemplary embodiment, the histogram obtained in the step S204 is used, the invalid bit width m is determined using any of the methods shown below, the invalid bit width m is used, and the valid bit width (N−m) is calculated.

(Method 1) Maximum mv in which the number of times is not 0. In the histogram shown in FIG. 7, mv=5.
(Method 2) mv with the maximum number of times. In the histogram shown in FIG. 7, mv=4.
(Method 3) weighted average of fluctuation bit width mv. In the histogram shown in FIG. 7, if the number of times N of mv=i is Ni, mv is obtained by the (formula 1) shown below.

$$<mv>=(N1 \cdot mv1+N2 \cdot mv2+N3 \cdot mv3+N4 \cdot mv4+N5 \cdot mv5)/(N1+N2+N3+N4+N5) \quad \text{(formula 1)}$$

The valid bit width for the histogram shown in FIG. 7 is 11 (=16−5) according to (method 1). The valid bit width is 12 (=16−4) according to (method 2). The valid bit width is (16−<mv>) according to (method 3).

The process returns to FIG. 6A, and, in the next step S104, the image inspector 40 (image data generator 404) is controlled so that the input image data that is the compression target is input. The units in which the input image data is input are not particularly limited; however, the units may be page units, for example.

In the next step S106, the image data generator 404 is controlled so that the input image data is subjected to the data conversion process using the valid bit width (N−m), and the conversion image data is generated. As previously described, the data conversion process according to the exemplary embodiment makes the value of the bit associated with the valid bit region into the pixel value of the input image data, and makes the value of the bit associated with the invalid bit region into the fixed value (for example, white, black, or a pixel value average).

In the next step S108, the conversion image data generated in step S106 is subjected to the compression process. In the exemplary embodiment, the run length compression is used as the compression method.

In the step S110, whether the compression process for all the pixel values of the input image data is finished is determined. The process returns to step S104 in a case where the determination is a negative determination, and the next pixel value of the input image data is input. Meanwhile, in a case where the determination is a positive determination, the process proceeds to the step S112.

In the step S112, the memory controller 44 is controlled so that the compression data is stored in the memory 14.

In the next step S1.14, the memory controller 44 is controlled so that the compression data is read out from the memory 14. The read compression data may be temporarily stored in the storage unit, such as the RAM 16C.

In the next step S116, the expansion portion 46 is controlled so that the read compression data is subjected to the expansion process, and the output image data corresponding to the input image data is generated. Output image data subjected to the expansion processing may be temporarily stored in the storage unit, such as the RAM 16C. Thereafter, the compression and expansion processing program finishes. In the image processing apparatus 10 according to the exemplary embodiment, the expanded output image data is sent to the image output portion 22, and image formation is performed on the recording paper, for example.

(Second Exemplary Embodiment)

A compression and expansion portion 12b according to the exemplary embodiment will be described with reference to FIGS. 8A to 10. The exemplary embodiment is an aspect that calculates the valid bit width while monitoring the compression rate in the image compression process, instead of calculating the valid bit width using the test image. That is, the exemplary embodiment is an aspect in which a constant invalid bit width is held by maintaining the compression rate at a value close to a target value set in advance, and the compression rate is improved. The invalid bit width may be a bit width in which the fluctuations in the reading precision of the sensor are predicted, or may be a bit width close thereto.

As shown in FIG. 8A, the compression and expansion portion 12b is provided with an image data generator 50, the compression portion 42, a compression rate monitoring portion 48, the memory controller 44, and the expansion portion 46. In FIG. 8A, the memory 14 in which the compression data is stored is also displayed together.

The image data generator 50 uses the provided valid bit width while inputting the input image data, subjects the input image data to the above-described data conversion process and generates the conversion image data. That is, the value of the bit associated with the valid bit region is set as the pixel value of the input image data itself, and the value of the bit associated with the invalid bit region is set as a fixed value.

The compression portion 42 compresses the conversion image data as described above. The compression method according to the exemplary embodiment is a run length compression, as an example.

The compression rate monitoring portion 48 monitors the compression rate of the compression data compressed by the compression portion 42, and calculates the valid bit width so as to converge on the compression rate (target compression rate) set in advance. The compression rate k is an index generally defined by (post-compression data amount)/(pre-compression data amount), and since the compression rate is calculated for each compression process in the exemplary embodiment, the compression rate k is defined by (formula 2) shown in below.

$$k = \text{(number of accumulated pixels of compression data)} / \text{(number of accumulated pixels of input image data)} \quad \text{(formula 2)}$$

As described above, the memory controller 44 controls the storage of the compression data in the memory 14 and the reading of the compression data from the memory 14.

The expansion portion 46 subjects the compression data to the expansion process as described above and outputs the data as the output image data.

Next, the compression rate monitoring portion 48 is described in more detail with reference to FIG. 8B. As shown in FIG. 8B, the compression rate monitoring portion 48 according to the exemplary embodiment is configured to include a compression rate comparison portion 480 and a valid bit width calculator 482.

The compression rate comparison portion 480 is a component that compares the compression rate of the compression data compressed by the compression portion 42 and the target compression rate. The compared results in which either the calculated compression rate is larger than the target compression rate or the calculated compression rate is the target compression rate or less are output to the valid bit width calculator 482 at the next stage.

The valid bit width calculator 482 is a component that calculates and outputs the valid bit width so that the compression rate k of the compression data converges on the target compression rate $k^*$. In the exemplary embodiment, the valid bit width is dynamically calculated sequentially according to the valid bit width calculation procedure below each time the comparison results of the compression rate comparison portion 480 are received.

(Procedure 1) In a case where the calculated compression rate is larger than the target compression rate, the current valid bit width is reduced by one bit.

(Procedure 2) In a case where the calculated compression rate is the target compression rate or less, the current valid bit width is increased by one bit or left as is.

Whether to increase the valid bit width by one bit or to use as is in (procedure 2) may be determined according to the value of the divergent $k^*-k$ from the target compression rate $k^*$ of the compression rate k when compared by the compression rate comparison portion 480. The target compression rate $k^*$ may be stored in advance in the storage unit such as the ROM 16B.

Next, the compression and expansion process and the valid bit width calculation process according to the exemplary embodiment are described with reference to FIGS. 9A and 9B. FIG. 9A is a flowchart showing the processing flow of the compression and expansion processing program according to the exemplary embodiment, and FIG. 9B is a flowchart showing the processing flow of the valid bit width calculation processing subroutine called by the compression and expansion program. Although the compression and expansion process shown in FIG. 9A, similarly to the above-described exemplary embodiment, shows the compression process and the expansion process as a continuous series of processes, naturally, these processes may be executed independently as separate processes. Execution of the present compression and expansion processing program is already commanded by the user via the UI 20 or the like.

First in the step S300, the initial value of the valid bit width (N−m) is set. Although the initial value of the valid bit width is not particularly limited, the value may be N (number of all bits of pixel value). Alternatively, the valid bit width calculated according to the test image in the exemplary embodiment may be the present initial value. In this case, the processes of the steps S100 and S102 shown in FIG. 6A may be executed instead of the process in the step S300. The initial value of the valid bit width may be stored in advance in the storage unit, such as the ROM 16B and the RAM 16C.

Although the input image data is input in the next step S302, the conversion image data is generated in the step S304, and the compression process is executed with respect to the conversion image data in the step S306, since these processes are the same processes as those of the steps S104, S106, and S108 shown in FIG. 6A, a detailed description thereof will not be made. In the exemplary embodiment, the input image data is sequentially input in pixel value units, and the conversion image data is generated for each pixel value and compressed.

In the next step S308, the valid bit width calculator 482 is controlled so as to execute the valid bit width calculation process. FIG. 9B shows the valid bit width calculation processing subroutine program that executes the present valid bit width calculation process.

In the step S400, the compression rate comparison portion 480 is controlled so as to calculate the compression rate k defined by (formula 2) at the point in time that a given pixel value is subjected to compression.

In the next step S402, the compression rate comparison portion 480 is controlled so as to compare the calculated compression rate k and the target compression rate k*. The comparison results may be result=1 in a case where the calculated compression rate is larger than the target compression rate, and result=0 in a case where the calculated compression rate is the target compression rate or lower.

In the step S404, the valid bit width calculator 482 is controlled so as to calculate the valid bit width (N−m) according to the valid bit width calculation procedure using the comparison results obtained in the step S402, and send the bit width to the compression rate monitoring portion 48. That is, the valid bit width is calculated according to the following valid bit width calculation procedure.

$$\text{result}=1 \rightarrow (N-m)-1(\text{subtract } 1) \quad \text{(Procedure 1)}$$

$$\text{result}=0 \rightarrow (N-m)+1(\text{add } 1) \quad \text{(Procedure 2)}$$

Thereafter, the procedure returns to the compression and expansion processing program shown in FIG. 9A.

In the next step S310, for all of the input image data, that is in the exemplary embodiment, it is determined whether the processes of the steps S302 to S308 are finished for all pixels, and the process returns to the step S302 in a case where the determination is a negative determination, and the next pixel value of the input image data is input. The valid bit width in the subsequent process uses the newest valid bit width (N−m) calculated in the step S404.

Figure 10:
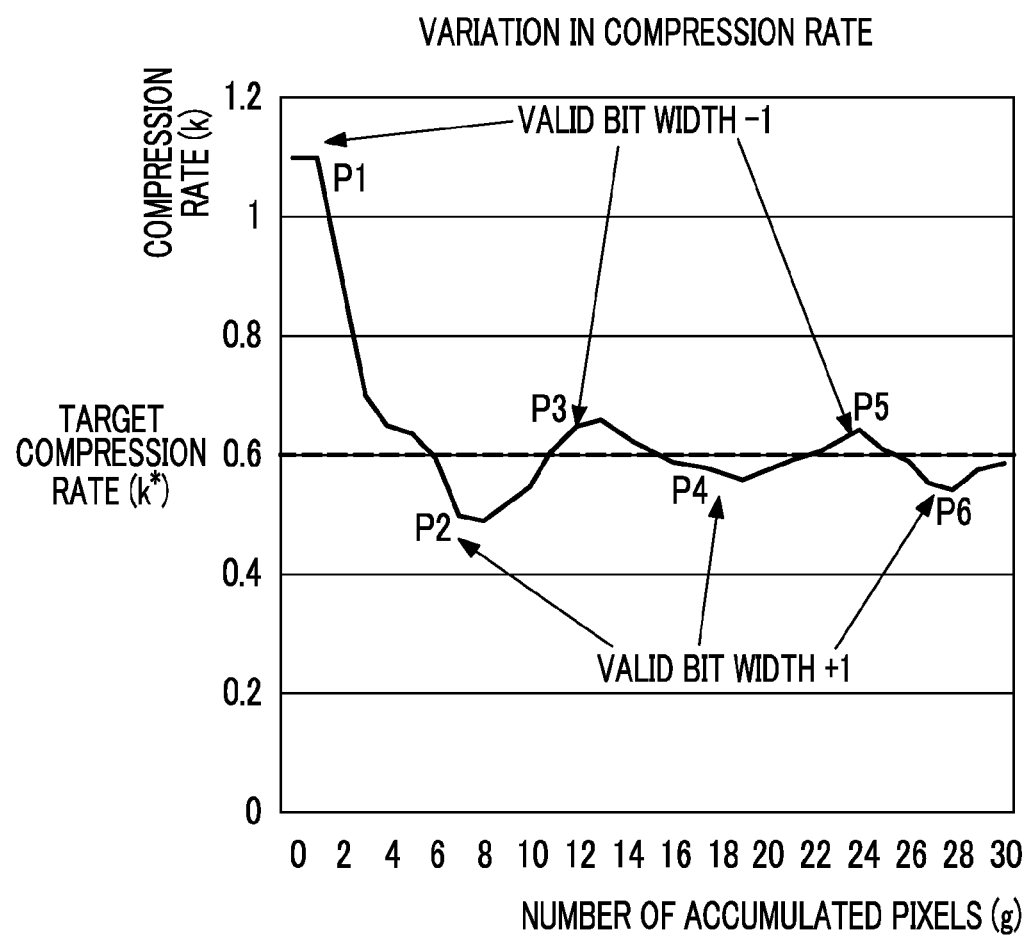
FIG. 10 is a graph showing variations in a compression rate with respect to a number of accumulated pixels according to the second exemplary embodiment.

FIG. 10 shows an example of variations in the compression rate k according to the processes of the steps S302 to S310. FIG. 10 is a graph in which the number g of accumulated pixels up to the pixel corresponding to the pixel value input in the step S302 is the horizontal axis and the compression rate k is the vertical axis. In the example shown in FIG. 10, the target compression rate k* satisfies k*=0.6.

In FIG. 10, the points indicated by P1 to P6 indicate the switching points of the (procedure 1) or (procedure 2). That is, the points P1, P3, and P5 indicate points where 1 is subtracted from the valid bit width according to the (procedure 1), and the points P2, P4, and P6 indicate points where 1 is added to the valid bit width according to the (procedure 2).

As shown in FIG. 10, when the number g of accumulated pixels is in the vicinity of 1, the compression rate k is larger than 1. This is because the effects of the run length compression do not appear when the number g of accumulated pixels does not reach a fixed value as found from the data format of the compression data in FIG. 5E. Accordingly, at point P1, the process that subtracts 1 from the valid bit width at that time is executed. When the valid bit width is reduced (invalid bit width is increased), the compression rate k is lowered since the pixel value subjected to run length compression is increased.

As shown in FIG. 10, the target compression rate k* is crossed during the transition from the point P1 to the point P2, that is, the compression rate k becomes smaller than the target compression rate k* at the point in time when transitioning to the point P2. Thus, 1 is added to the valid bit width at this point in time at the point P1. When the valid bit width is increased (invalid bit width is decreased), the compression rate k is increased since the pixel value subjected to run length compression is decreased.

Furthermore, since the compression rate k at this point in time exceeds the target compression rate k* at the point P3, the process is performed so that the valid bit width at this time is reduced by 1, and the compression rate k is lowered. Below, the addition and subtraction processes are similarly executed with respect to the valid bit width in points P4 to P6.

Next, with reference to FIG. 9A, the compression data is stored in the memory 14 in the next step S312, the compression data is read from the memory 14 in the step S314, and the read compression data is expanded in the step S316. Since the above process is similar to those of the steps S112, S114, and S116 shown in FIG. 6A, a detailed description will not be provided.

According to the image compression apparatus and image processing apparatus according to the exemplary embodiment, the compression rate is further maintained in the vicinity of the target value in addition to realizing a high compression rate.

(Third Exemplary Embodiment)

Figure 12:
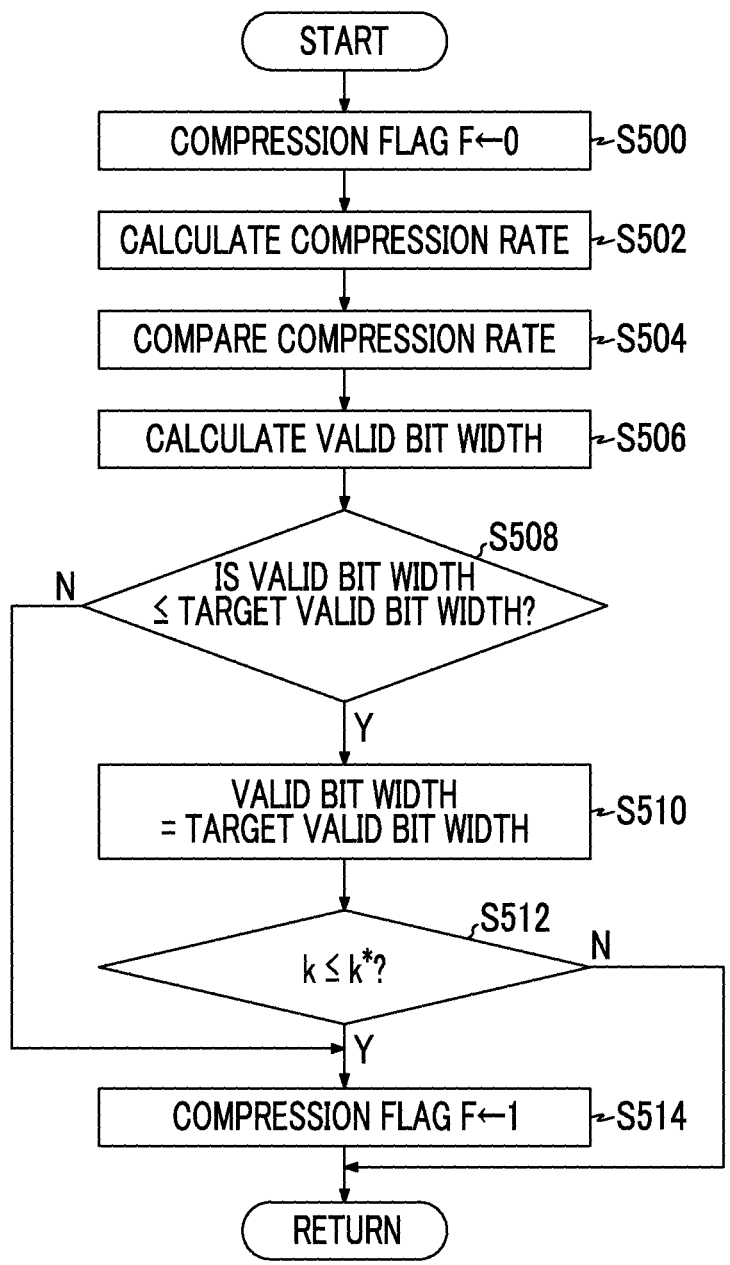
FIG. 12 is a flowchart showing a processing flow of the valid bit width calculation processing subroutine program according to the third exemplary embodiment.

The compression and expansion portion according to the exemplary embodiment will be described with reference to FIGS. 11A to 12.

FIG. 11A shows a block diagram of a compression and expansion portion 12c according to the exemplary embodiment, and FIG. 11B shows a block diagram of a compression rate monitoring portion 48a that configures a portion of the compression and expansion portion 12a. The main routine of the compression and expansion process according to the exemplary embodiment is the same as the main routine of the compression and expansion process shown in FIG. 9A, and only the valid bit width calculation processing subroutine of step S308 is different. FIG. 12 is a flowchart showing a processing procedure of the valid bit width calculation processing subroutine program according to the exemplary embodiment. The exemplary embodiment is an aspect in which a lower limit is further provided in the valid bit width in the exemplary embodiment.

In the exemplary embodiment, the run length compression is employed as an example of the compression format, and the invalid bit region is substituted with a fixed value. Therefore, the compression method according to the exemplary embodiment may be said to be an irreversible compression method, that is, a compression method where there are cases in which the pre-compression data and the data passing through compression and expansion do not completely match. Accordingly, when the pixel value of the conversion image data for which the results subjected to the replacement process, and the pixel value of the input image data are different increases (compression rate increase), it is assumed that the difference between the post-expansion output image and the original image corresponding to the input image data increases, that is, that the precision at reproduction of the image deteriorates.

Therefore, because the exemplary embodiment further suppresses deterioration of the reproduction precision of the post-expansion image, control is performed so that the valid bit width is maintained at the designated bit (target bit width) or more. Thereby, since it is assumed that the post-compression data amount exceeds the data amount of the original image, switching between compression and non-compression of the pixel value is performed according to the compression rate. Since it is thought that there is a fixed correlation between the number of pixel values subjected to replacement processing and the compression rate, it is thought that controlling the compression rate to the target value works in the direction of suppressing deterioration of the reproduction precision of the post-compression image.

As shown in FIG. 11A, the compression and expansion portion 12c is provided with the image data generator 50, a compression portion 42a, the compression rate monitoring portion 48a, the memory controller 44, and the expansion portion 46. In FIG. 11A, the memory 14 in which the compression data is stored is also shown together.

The image data generator 50 is the same as the image data generator 50 shown in FIG. 8A and uses the provided valid bit width while inputting the input image data, subjects the input image data to the above-described data conversion process and generates the conversion image data. That is, the value of the bit associated with the valid bit region is set as the pixel value of the input image data itself, and the value of the bit associated with the invalid bit region is set as a fixed value.

The compression rate monitoring portion 46a monitors the compression rate of the compression data compressed by the compression portion 42a, and calculates the valid bit width so as to converge on the compression rate (target compression rate) set in advance. Although the details of the calculation process of the valid bit width are described later, in the exemplary embodiment, a lower limit is provided in the valid bit width.

The compression portion 42a subjects the conversion image data to run length compression. However, in the exemplary embodiment, whether to perform the compression process is controlled according to the valid bit width calculated above and the compression rate at the point in time of the calculation of the valid bit width.

The memory controller 44 controls the storage of the compression data in the memory 14 and the reading of the compression data from the memory 14.

The expansion portion 46 subjects the compression data to the expansion process as described above and outputs the data as the output image data.

Next, the compression rate monitoring portion 48a according to the exemplary embodiment is described in more detail with reference to FIG. 11B. As shown in FIG. 11B, the compression rate monitoring portion 48a is configured to include the compression rate comparison portion 480 and a valid bit width calculator 482a.

The compression rate comparison portion 480 is the same as the compression rate comparison portion 480 shown in FIG. 8B, and is a component for comparing the compression rate of the compression data compressed by the compression portion 42a and the target compression rate. The compared results in which either the calculated compression rate is larger than the target compression rate or the calculated compression rate is the target compression rate or less are output to the valid bit width calculator 482a at the next stage.

The valid bit width calculator 482a is a component that calculates and outputs the valid bit width so that the compression rate of the compression data converges on the target compression rate k*. In the exemplary embodiment, the valid bit width is dynamically calculated sequentially according to the valid bit width calculation procedure below each time the comparison results of the compression rate comparison portion 480 are received.

(Procedure 1) in a case where the calculated compression rate is larger than the target compression rate, the current valid bit width is reduced by one bit.

(Procedure 2) In a case where the calculated compression rate is the target compression rate or less, the current valid bit width is increased by one bit or left as is.

In the exemplary embodiment, in a case where the calculated valid bit width and the target valid bit width are compared and the valid bit width is less than the target valid bit width, the valid bit width=the target valid bit width, and the valid bit width is suppressed to the lower limit value. In this case, the process below is subsequently performed.

(Procedure 3) Compression continues in a case where the compression rate k is the target compression rate k* or lower.

(Procedure 4) The compression is stopped with the pixel value set as unchanged pixel value of the input image data in a case where the compression rate k exceeds the target compression rate k*.

The valid bit width calculator 482a outputs the compression signal, which is a signal for executing the control of whether or not the compression is performed, with respect to the compression portion 42a.

The compression and expansion process according to the exemplary embodiment will be described with reference to FIGS. 9A and 12. Since description is already provided for FIG. 9A, description will not be repeated below.

With reference to FIG. 9A, in the step S300, the initial value of the valid bit width is set. In the next step S302, the pixel value of the input image data is input in pixel units.

In the next step S304, the image data generator 50 is controlled so as to perform the data conversion process with respect to the input image data using the valid bit width calculated by the valid bit width calculator 482a.

In the step S306, the compression portion 42a is controlled according to a compression flag, described later, so that the compression process is executed with respect to the conversion image data in a case where the compression is instructed by the compression flag, and compression is not executed in a case where compression is not instructed by the compression flag. More specifically, in the exemplary embodiment, compression is executed in a case where the compression flag F is F=1, and compression is not executed in a case where F=0.

In the next step S308, the valid bit width calculator 482a is controlled so as to execute the valid bit width calculation process.

The valid bit width calculation process according to the exemplary embodiment is described with reference to FIG. 12.

First, in the step S500, an initial value 0 is substituted for the compression flag F. The meaning of the compression flag F is that when F=0 does not perform compression, and F=1 performs compression.

In the step S502, the compression rate comparison portion 480 is controlled so as to calculate the compression rate k defined by (formula 2) at the point in time that a given pixel value is subjected to compression.

In the next step S504, the compression rate comparison portion 480 is controlled so as to compare the calculated compression rate k and the target compression rate k*. The comparison results may be result=1 in a case where the calculated compression rate is larger than the target compression rate, and result=0 in a case where the calculated compression rate is the target compression rate or lower.

In the step 3506, the valid bit width calculator 482a is controlled so as to calculate the valid bit width (N−m) according to the valid bit width calculation procedure using the comparison results obtained in the step S504, and send the bit width to the image data generator 50. That is, the valid bit width is calculated according to the following valid bit width calculation procedure.

result=1→(N−m)−1(subtract 1)  (Procedure 1)

result=0→(N−m)+1(add 1)  (Procedure 2)

In the next step S508, whether the valid bit width (N−m) calculated in step S506 is less than the target valid bit width (N−m)* is determined. In a case where the determination is a negative determination, the process transitions to the step S514, sets the compression flag F to 1, and returns to the compression and expansion main program. Meanwhile, in a case where the determination is a positive determination, the process proceeds to the step S510. The flag F is an example of a compression signal output by the valid bit width calculator 482a.

In the step 510, the valid bit width (N−m) is set as the target valid bit width (N−m)*.

In the next step S512, whether the compression rate k is the target compression rate k* or lower is determined. In a case where the determination is a positive determination, the process transitions to the step S514 and sets the compression flag F to 1, whereas, in the case of a negative determination, the process returns to the compression and expansion main program.

With reference to FIG. 9A again, as described above, in the step S310, whether the compression process is completed for all pixels is determined, and the process returns to the step S302, thereby continuing the input of the input image data in a case where not finished, whereas the process transitions to the step 312, thereby storing the compression data in the memory 14 in a case where finished. In the next step S314, the compression data is read out. After the compression data is expanded in the next step S316, the present compression and expansion processing program finishes.

As described above in detail, according to the image compression apparatus and image processing apparatus according to the exemplary embodiment, resolution of the expanded image is maintained at the target value in addition to realizing a high compression rate.

In each of the exemplary embodiments, although an aspect is described using a white pixel value as the pixel value of the test image as an example, there is no limitation thereto. For example, the aspect may use a pixel value of another color, or may use a pixel value that changed in a continuous gradation, without being limited to one pixel value.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image compression apparatus comprising:
a central processor configured to execute as:
a dividing unit that divides a bit width pixel value set in advance that indicates compressed image information into an invalid bit region and a valid bit region other than the invalid bit region that are replaced with a fixed value determined in advance;
an image information conversion unit that makes a value of the valid bit region be the value of a bit corresponding to a pixel value and makes a value of the invalid bit region be the fixed value determined in advance and converts the compressed image information to conversion image information; and
a compression unit that compresses the conversion image information,
wherein the compressed image information is image information read out and acquired by an image reading unit,
wherein the dividing unit compares a pixel value of test image information in which a test image with the pixel value set in advance is read out and acquired by the image reading unit and the pixel value set in advance and divides the bit width pixel value set in advance into the invalid bit region and the valid bit region other than the invalid bit region that has a bit width with a value different from the bit width set in advance, and
wherein the dividing unit acquires the bit width with a different value for each pixel value by comparing the pixel value of the test image information and the pixel value set in advance for the each pixel value generates a frequency distribution by calculating a number of pixel values that have bit widths with different values for the each bit width, and divides the pixel value into the invalid bit region and the valid bit region by determining the invalid bit region using the frequency distribution.

2. The image compression apparatus according to claim 1, wherein the dividing unit divides the pixel value into the invalid bit region and the valid bit region by determining any of the bit width indicating a maximum frequency in the frequency distribution, a maximum bit width in which a frequency in the frequency distribution is not 0, and a weighted average of bit width of the frequency distribution as the invalid bit region.

3. The image compression apparatus according to claim 2, wherein the compression unit compresses the conversion image information using run length compression.

4. The image compression apparatus according to claim 1, wherein the compression unit compresses the conversion image information using run length compression.

5. An image processing apparatus comprising:
the image reading unit that reads out an image and acquires the compressed image information;
the image compression apparatus according to claim 1;
a storage unit that stores the compression image information compressed by the compression unit;
an expansion unit that expands the compression image information; and an output unit that performs output by executing a predetermined image processing set in advance on the compression image information expanded by the expansion unit.

6. The image processing apparatus according to claim 5, wherein the image reading unit is an image sensor.

7. An image compression apparatus comprising:
a central processor configured to execute as:
a dividing unit that divides a bit width pixel value set in advance that indicates compressed image information into an invalid bit region and a valid bit region other than the invalid bit region that are replaced with a fixed value determined in advance;
an image formation unit that makes a value of the valid bit region be a value of a bit corresponding to a pixel value and makes a value of the invalid bit region be the fixed value determined in advance and converts the compressed image information to conversion image information,
a compression unit that compress the conversion image information; and
a compression rate monitoring unit that monitors a compression rate for each pixel value of the compressed image information,
wherein the dividing unit divides the pixel value into the invalid bit region and the valid bit region by adding and subtracting a bit width of the invalid bit region so that the compression rate converges on a target compression rate to determine the invalid bit region.

8. The image compression apparatus according to claim 7, wherein, when a bit width of the divided valid bit region is less than a target valid bit width that is a lower limit of the bit width of the valid bit region, the dividing unit makes the bit width of the valid bit region be the target valid bit width, and
the compression rate monitoring unit continues the compression by the compression unit when the compression rate is the target compression rate or less, and stops the compression by the compression unit when the compression rate is over the target compression rate.

9. The image compression apparatus according to claim 8, wherein the compression unit compresses the conversion image information using run length compression.

10. The image compression apparatus according to claim 7, wherein the compression unit compresses the conversion image information using run length compression.

* * * * *